United States Patent [19]
Modert

[11] 3,990,787
[45] Nov. 9, 1976

[54] SQUARE WAVE LIGHT GENERATOR

[75] Inventor: Eugene F. Modert, New London, Conn.

[73] Assignee: The United States of America as represented by the Secretary of the Navy, Washington, D.C.

[22] Filed: Sept. 25, 1975

[21] Appl. No.: 616,795

[52] U.S. Cl. ............................................... 350/275
[51] Int. Cl.² ...................................... G05D 25/00
[58] Field of Search .................. 350/266, 272–275; 250/232, 233; 240/46.03

[56] References Cited
UNITED STATES PATENTS

| | | | |
|---|---|---|---|
| 2,687,337 | 8/1954 | Alford | 250/233 X |
| 2,761,959 | 9/1956 | Kunins | 350/272 X |
| 2,878,710 | 3/1959 | Willey | 250/233 X |
| 3,574,445 | 4/1971 | Harmon | 350/275 X |
| 3,709,600 | 1/1973 | Ganshorn | 350/275 X |
| 3,778,620 | 12/1973 | Lindemann et al. | 250/232 |

*Primary Examiner*—John K. Corbin
*Assistant Examiner*—F. L. Evans
*Attorney, Agent, or Firm*—Richard S. Sciascia; Arthur A. McGill; Prithvi C. Lall

[57] ABSTRACT

Light rays are provided in square wave form at uniform intervals. A source of light is provided within three cylinders. The first cylinder being stationary has an aperture extending 120°. The second and third cylinders each have apertures extending 240°, and the cylinders rotate in opposite directions. In operation the device gives equal light and dark periods with a rise and fall time one-half the period of the full open and full close time. The length of the periods are dependent on the rotational velocity of the cylinders.

6 Claims, 8 Drawing Figures

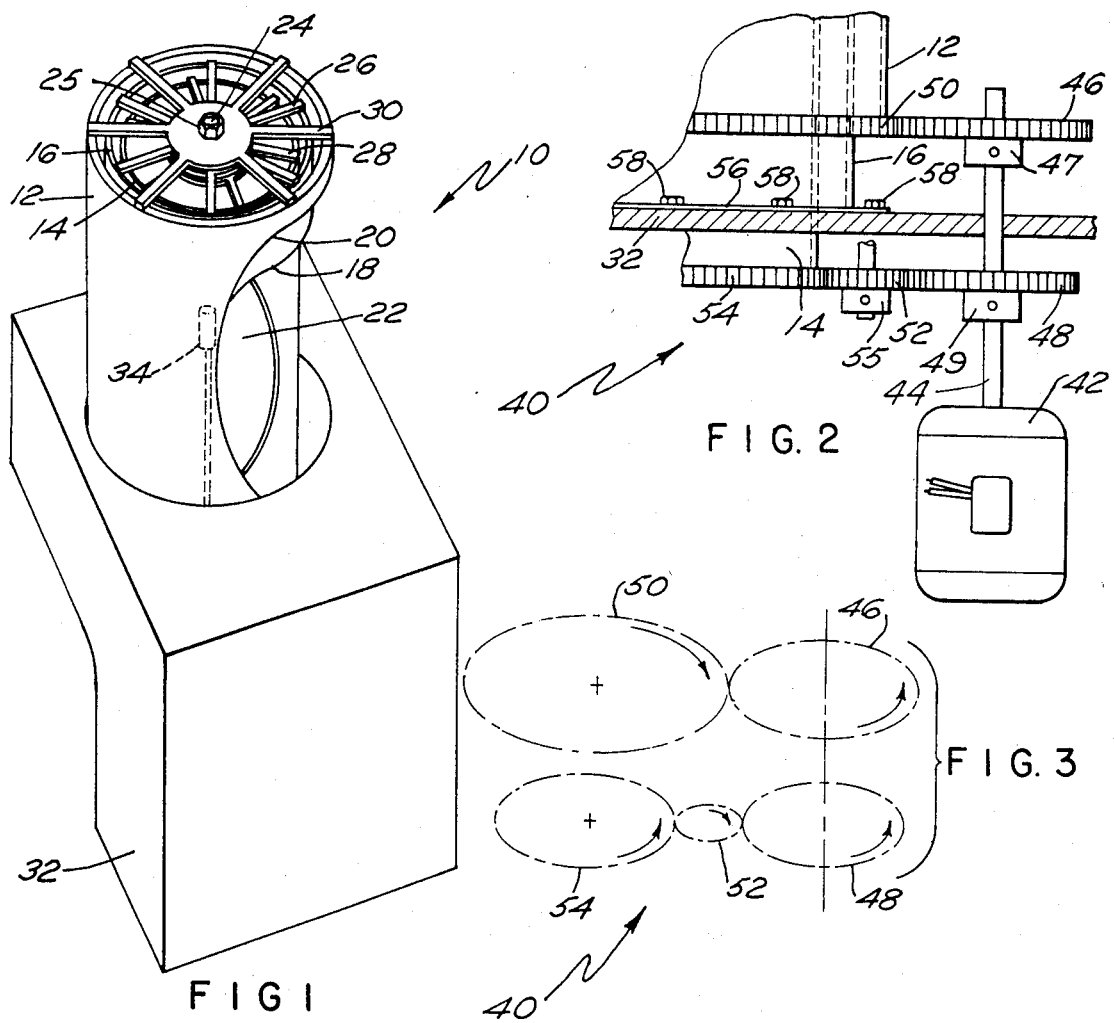
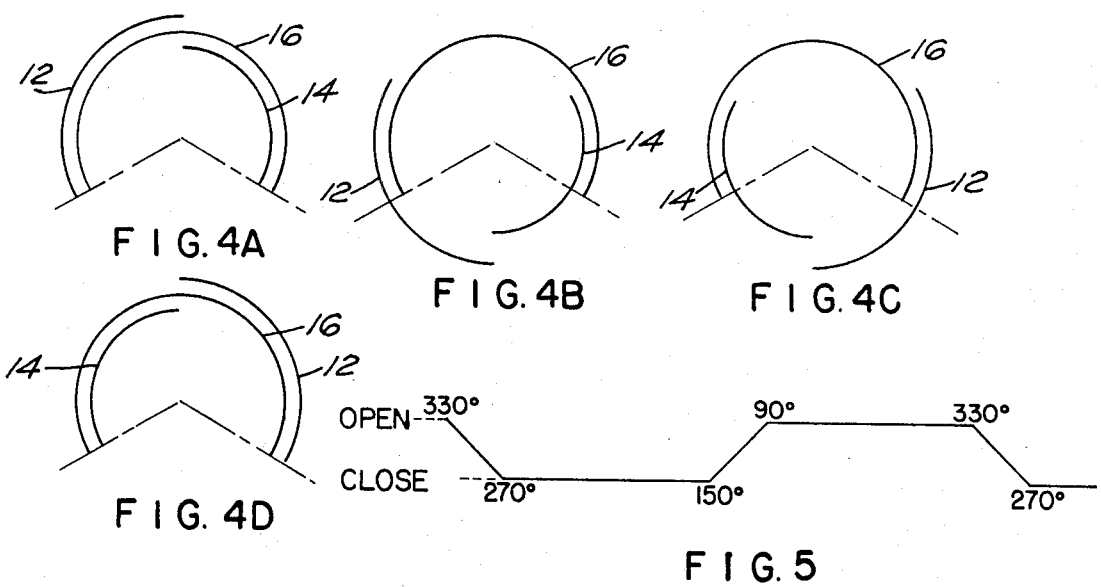

SQUARE WAVE LIGHT GENERATOR

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention generally relates to signalling equipment and more particularly to a device for generating uniform light pulses. The invention is uniquely applicable for use with an infrared source of energy.

Many prior art devices for generation of light signals have relied on discs. The discs are opaque with defined transparencies often in the form of cutouts for the transmission of light. Such devices while useful are often bulky and lack the ruggedness and uniformity associated with the present invention.

SUMMARY OF THE INVENTION

It is therefore a general object of the present invention to provide a device for generating improved light signals of a predetermined shape and frequency. Another feature is that the device is operable at a higher frequency than previously known systems. It is a further object that the device provide housing protection for the light source. Further objects are that the device be compact, light in weight, economical, rugged and durable. These and other objects of the invention and the various features and details of construction and operation will become apparent from the specification and drawings.

This is accomplished in accordance with the present invention by providing a plurality of cylinders enclosing a light source in which the cylinders have sections removed to form apertures for the transmission of light to an external predetermined target. Two of the cylinders are rotated in opposing directions. A stationary cylinder is interposed between the rotating cylinders. A constant light source is located on a common axis of all cylinders. A light signal is externally supplied upon the coincidence of apertures in the cylinders as the cylinders revolve.

BRIEF DESCRIPTION OF THE DRAWINGS

FIG. 1 is a pictorial view of the square wave light generator in accordance with the present invention;

FIG. 2 is a diagram of the gear assembly located within the mounting base of FIG. 1;

FIG. 3 is a schematic of the gear assembly of FIG. 2;

FIGS. 4a, 4b, 4c and 4d are diagrammatic representations of the rotation of the cylinders of FIG. 1; and FIG. 5 is a graph showing the operating characteristics of the device of FIG. 1.

DESCRIPTION OF THE PREFERRED EMBODIMENT

Referring now to FIG. 1 there is generally shown a light generator 10. It comprises an outer revolving cylinder 12, an inner revolving cylinder 14 and a central stationary cylinder 16. As viewed from the top the outer cylinder 12 revolves in a clockwise direction and the inner cylinder 14 revolves in a counterclockwise direction. Both cylinders 12 and 14 revolve at the same uniform rpm. Stationary cylinder 16 has an aperture 18 of 120° angle. Revolving cylinders 12 and 14 have respective apertures 20 and 22 with each having a 240° angle. All aperture angles are measured at their maximum widths.

Cylinder 16 is fixedly mounted to a shaft 24 through frame 26. The shaft 24 has a nut 25 fastened to its top. Cylinders 12 and 14 are slidably mounted through bearing surfaces to shaft 24 by means of respective frames 30 and 28. A typical infrared light assembly 34 is located centrally within cylinders 12, 14 and 16. The light waveform generator 10 is mounted to and partially enclosed by base 32.

FIG. 2 shows a gear train assembly 40 located within base 32 and not visible from the front. A motor 42 is used to drive a shaft 44 to which gear wheels 46 and 48 are mounted. The gears wheels 46 and 48 have respective bases 47 and 49 for connecting to shaft 44. The motor 42 can be of any type suitable for a given application such as synchronous or variable speed drive.

The gears 46 are linked with gear wheel 50 connected to the outer surface of cylinder 12 for driving purposes. The gears 48 are linked through pinion 52 having a boss 55, to gear wheel 54, which in turn is connected to the outer surface of cylinder 14 for driving cylinder 14 in the opposite direction to cylinder 12.

A rim 56 of stationary cylinder 16 is affixed in an inner portion of base 32 by means of screws 58. This provides a sttionary reference for cylinders 12 and 14 to revolve about.

FIG. 3 shows a schematic diagram of the gear train assembly 40. It is readily observable that the insertion of pinion 52 causes gear wheel 54 to revolve in the opposite direction to that of gear wheel 50.

The operation of the system can best be understood by referring to FIGS. 4A, 4B, 4C, 4D and 5. The FIGS. 4A, 4B, 4C and 4D show a view of the cylinders 12, 14 and 16, at different times during one complete cycle. The missing portion of the cylinders 12, 14 and 16 is where apertures 18, 20 and 22 are located in FIG. 1. The central cylinder 16 remains stationary at all times. FIG. 5 is drawn to show the open and closed positions with reference to the leading edge of inner cylinder 14.

FIG. 4A shows the apertures of cylinders 12, 14 and 16 aligned for the emission of light. The leading edge of cylinder 14 is at 330° on the coordinate axis. This is shown as the starting point of the cycle in FIG. 5. FIG. 4B then shows the closed position. This takes place after cylinder 14 has rotated 60° in the clockwise direction. This is shown at 270° in FIG. 5. FIG. 4C is where the cylinder apertures begin to open. This is shown at 150° in FIG. 5. FIG. 4D is where the apertures are fully open. This is shown at 90° in FIG. 5. The cycle then returns to FIG. 4A and repeats itself. It is readily seen from FIG. 5 that the fully open and fully close positions are retained for a period that is twice as long as the transient position therebetween.

There has therefore been shown a system for modifying light emissions. Conversely light could be transmitted in the opposite direction to a target within the cylinders. The device is uniquely suitable for infrared transmission and allows a smaller package design, creates a more defined chop with possibilities for other areas of use. Reduction in cylinder diameters reduce cylinder load forces thereby permitting higher rotational velocities in the area of 100,000 rpm. The size of the aperture openings can be modified and/or the cylinders can be rotated at different rpms in relationship to each other depending upon the application.

It will be understood that many additional changes in the details, materials, steps and arrangement of parts, which have been herein described and illustrated in order to explain the nature of the invention, may be made by those skilled in the art within the principal and scope of the invention as expressed in the appended claims.

What is claimed is:

1. A square wave light generator comprising:
    a source of light for generating a light signal;
    a stationary cylinder positioned coaxially on its longitudinal axis with said source of light, said stationary cylinder partially enclosing said source of light, said stationary cylinder having an aperture in its lateral wall to transmit the light signal from said source of light;
    a first rotatable cylinder positioned coaxially on its longitudinal axis with said stationary cylinder, said first rotatable cylinder adapted to be rotated on its longitudinal axis in a first direction, said first rotatable cylinder having an aperture in its lateral wall to transmit the light signal from said source of light;
    a second rotatable cylinder positioned coaxially on its longitudinal axis with said stationary cylinder and said first cylinder, said second rotatable cylinder adapted to be rotated on its longitudinal axis in a second direction, said second direction being opposite to said first direction, said second rotatable cylinder having an aperture in its lateral wall to transmit the light signal from said source of light; and
    rotation means for rotating said first rotatable cylinder and said second rotatable cylinder on their respective longitudinal axes, said rotation means further adapted for rotating said first and second rotatable cylinders in opposite directions at equal angular speed.

2. A square wave light generator according to claim 1 further comprising:
    said aperture of said stationary cylinder extends over an arc of 120°;
    said aperture of said first cylinder extends over an arc of 240°; and
    said aperture of said second cylinder extends over an arc of 240°.

3. A square wave light generator according to claim 2 wherein said rotation means further comprises:
    alignment means for aligning the apertures of said first, second and stationary cylinders for providing emission of the light signal through a 120° arc for one-third of said first and second cylinders rotation and for providing no emission of the light signal through said apertures for one-third of said first and second cylinders rotation.

4. A square wave light generator according to claim 3 wherein said rotation means further comprises:
    a first gear assembly for rotating said first cylinder in a predetermined direction;
    a second gear assembly for rotating said second cylinder in a direction opposite to that of said first cylinder;
    a common shaft connected for driving said first and second gear assemblies; and
    a motor connected for driving said common shaft.

5. A square wave light generator according to claim 4 further comprising:
    an upper shaft wherein said stationary cylinder is fixedly mounted and wherein said first and second cylinders are slidably mounted; and
    a base connected to said stationary cylinder.

6. A square wave light generator according to claim 5 further comprising:
    said first gear assembly has a first gear wheel connected to said common shaft and a second gear wheel connected to said first cylinder and meshing with said first gear wheel of said first gear assembly; and
    said second gear assembly has a first gear wheel connected to said common shaft and a second gear wheel connected to said second cylinder and a pinion meshing with both said first and second gear wheels of said second gear assembly.

* * * * *

Disclaimer and Dedication

3,990,787.—*Eugene F. Modert*, New London, Conn. SQUARE WAVE LIGHT GENERATOR. Patent dated Nov. 9, 1976. Disclaimer and dedication filed Dec. 19, 1977, by the assignee, *The United States of America as represented by the Secretary of the Navy.*

Hereby disclaims and dedicates to the Public all claims of said patent.

[*Official Gazette March 7, 1978.*]